(12) United States Patent
Kallenbach et al.

(10) Patent No.: US 6,562,231 B2
(45) Date of Patent: May 13, 2003

(54) CATALYST COMPOSITION AND PROCESSES THEREFOR AND THEREWITH

(75) Inventors: Lyle R. Kallenbach, Bartlesville, OK (US); Dwayne R. Senn, Bartlesville, OK (US)

(73) Assignee: ConocoPhillips Company, Houston, TX (US)

( * ) Notice: Subject to any disclaimer, the term of this patent is extended or adjusted under 35 U.S.C. 154(b) by 0 days.

(21) Appl. No.: 10/117,313

(22) Filed: Apr. 5, 2002

(65) Prior Publication Data

US 2003/0040430 A1 Feb. 27, 2003

Related U.S. Application Data

(62) Division of application No. 09/492,940, filed on Jan. 27, 2000, now abandoned, which is a division of application No. 09/069,803, filed on Apr. 30, 1998, now Pat. No. 6,037,299.

(51) Int. Cl.$^7$ .................... C10G 11/02; C10G 11/04
(52) U.S. Cl. ............... 208/114; 208/113; 208/118; 208/119; 208/120.01
(58) Field of Search .................... 208/113, 114, 208/118, 119, 120.01

(56) References Cited

U.S. PATENT DOCUMENTS

| | | | |
|---|---|---|---|
| 4,774,210 A | 9/1988 | Ray | 501/127 |
| 4,788,378 A | 11/1988 | Chang et al. | 585/739 |
| 4,804,642 A | 2/1989 | Ray | 501/87 |
| 4,804,646 A | 2/1989 | Ray | 501/105 |
| 5,227,347 A | 7/1993 | Fukase et al. | 504/96 |
| 5,427,689 A | 6/1995 | Kallenbach et al. | 210/670 |
| 5,461,021 A * | 10/1995 | Kallenbach | 423/278 |
| 5,561,095 A | 10/1996 | Chen et al. | 502/169 |
| 5,618,407 A * | 4/1997 | Kallenbach et al. | 208/113 |
| 5,705,723 A * | 1/1998 | Kallenbach et al. | 502/202 |
| 5,948,243 A * | 9/1999 | Kallenbach | 208/216 R |
| 5,994,257 A * | 11/1999 | Kallenbach | 423/279 |

* cited by examiner

Primary Examiner—Elizabeth D. Wood
(74) Attorney, Agent, or Firm—Jeffrey R. Anderson

(57) ABSTRACT

A composition comprises silicon, aluminum, zirconium, and boron. A process for producing the composition comprises contacting a silicon compound, an aluminum compound, a zirconium compound, and a boron compound under a condition sufficient to effect the production of a composition comprising silicon, aluminum, zirconium, and boron. Also disclosed is a process for catalytically cracking a hydrocarbon-containing fluid which comprises contacting said hydrocarbon-containing fluid with a catalyst composition which comprises silicon, aluminum, zirconium, and boron.

17 Claims, No Drawings

CATALYST COMPOSITION AND PROCESSES THEREFOR AND THEREWITH

This application is a divisional of application Ser. No. 09/492,940, now abandoned, filed Jan. 27, 2000 which is a divisional of application Ser. No. 09/069,803 filed Apr. 30, 1998, now U.S. Pat. No. 6,037,299.

FIELD OF THE INVENTION

This invention relates to a composition comprising silicon, aluminum, zirconium, and borate, to a process for producing the composition, and to a process for using the composition.

BACKGROUND OF THE INVENTION

A number of catalytic cracking catalysts such as zeolites are well known to those skilled in the art. Recently a composition comprising aluminum, zirconium, and borate is also known to be an effective catalytic cracking catalyst. See, for example, U.S. Pat. No. 5,618,407. A catalytic cracking generally involves steam and a catalytic cracking catalyst is generally regenerated in the presence of steam. The hydrothermal stability of the composition comprising aluminum, zirconium, and borate is generally not as good as one skilled in the art desires. Therefore, it appears there is an ever-increasing need to develop a catalyst which comprises aluminum, zirconium, and borate and is more hydrothermally stable.

SUMMARY OF THE INVENTION

An object of this invention is to provide a composition which comprises borate. Also an object of this invention is to provide a process for producing this composition. Another object of this invention is to employ this composition in a process for catalytically cracking hydrocarbons. An advantage of the invention is that the composition has good hydrothermal stability and product selectivity. Other objects and advantages will become apparent from the detailed description and the appended claims.

According to a first embodiment of this invention, a composition is provided which comprises aluminum, silicon, zirconium, and borate.

According to a second embodiment of this invention, a process is provided which comprises contacting a silicon compound, an aluminum compound, a zirconium compound, and a boron compound under a condition sufficient to effect the production of a solid material comprising silicon, aluminum, zirconium, and borate.

According to a third embodiment of this invention, a process which can be used for catalytically cracking a hydrocarbon or a mixture of hydrocarbons is provided. The process comprises contacting a first hydrocarbon-containing fluid with a catalyst composition under a catalytic cracking condition effective to a produce a second hydrocarbon-containing fluid in which the molecules or molecular weight of the hydrocarbons in the second hydrocarbon-containing fluid are smaller than those in the first hydrocarbon-containing fluid.

DETAILED DESCRIPTION OF THE INVENTION

According to the first embodiment of the invention, the composition of this invention comprises, consists essentially of, or consists of, silicon, aluminum, zirconium, and borate.

Generally, the composition can have a mole ratio of Si to Zr in the range of from about 0.001:1 to about 30:1, preferably about 0.01:1 to about 25:1 and most preferably 0.05:1 to 20:1; a mole ratio of Al to Zr in the range of from about 0.001:1 to about 300:1, preferably about 0.01:1 to about 250:1, and most preferably about 0.1:1 to about 200:1; and a mole ratio of (Al+Zr) to B in the range of from about 0.01:1 to about 10:1, preferably about 0.1:1 to about 6:1, and most preferably about 0.5:1 to about 3:1. Generally, the composition has a surface area, measured by the BET method employing $N_2$, of about 200 to about 400 $m^2/g$ and a pore volume, measured by a pore size distribution method employing $N_2$, of about 0.2 to about 1.5 cc/g.

The composition can be of any suitable shape such as spherical, cylindrical, trilobal or irregular, or combinations of two or more thereof. It also can have any suitable particle size. The presently preferred size is about 0.001 to about 1.0 mm, preferably about 0.01 to about 0.8 mm, and most preferably 0.01 to 0.5 mm. If particles of the composition have been compacted and extruded, the formed cylindrical extrudates generally have a diameter of about 1 to about 4 mm and a length of about 3 to about 10 mm. It is within the scope of this invention to have minor amounts of aluminum oxide and zirconium oxide, generally about 1 to about 5 weight % of each, present in the composition.

The composition can be produced by combining a silicon compound, an aluminum compound, a zirconium compound, and a boron compound under a condition effective to produce a solid material. The composition of the present invention is prepared by a method comprising coprecipitation. Generally any silicon compound, aluminum compound, zirconium compound, and boron compound which can be combined to form a solid material, preferably to form a coprecipitate, can be used in the present invention.

Examples of suitable silicon compounds include, but are not limited to, tetraethyl orthosilicate (tetraethoxysilane), tetrabutyl orthosilicate, tetrapropyl orthosilicate, or combination of two or more thereof. A number of well known silylating agents such as trimethylchlorosilane, chloromethyldimethylchlorosilane, N-trimethylsilylimidazole, N,O-bis(trimethylsilyl) acetamide, N-methyl-N-trimethylsilyltrifluoroacetamide, t-butyldimethylsilylimidazole, N-trimethylsilylacetamide, methyltrimethoxysilane, vinyltriethoxysilane, ethyltrimethoxysilane, propyltrimethoxysilane, (3,3,3-trifluoropropyl)trimethoxysilane, [3-(2-aminoethyl)aminopropyl]trimethoxysilane, cyanoethyltrimethoxysilane, aminopropyltriethoxysilane, phenyltrimethoxysilane, (3-chloropropyl)trimethoxysilane, (3-mercaptopropyl)trimethoxysilane, (3-glycidoxypropyl)trimethoxysilane, vinyltris(β-methoxyethoxy)silane, (γ-methacryloxypropyl)trimethoxysilane, (4-aminopropyl)triethoxysilane, [γ-(P-aminoethylamino)propyl]trimethoxysilane, (γ-glycidoxypropyl)trimethoxysilane, [β-(3,4-epoxycyclohexyl)ethyl]trimethoxysilane, (β-mercaptoethyl)trimethoxysilane, (γ-chloropropyl)trimethoxysilane, and combinations of two or more thereof can also be employed. The presently preferred silicon-containing compound is tetraethyl orthosilicate.

Examples of suitable aluminum compounds include, but are not limited to aluminum nitrate, aluminum chloride, aluminum bromide, aluminum phosphate, trimethyl aluminum, triethylaluminum, diethylaluminum chloride, and combinations of two or more thereof.

Examples of suitable zirconium compounds include, but are not limited to, zirconium acetylacetonate, zirconium citrate, zirconium acetate, zirconium bromide, zirconium chloride, zirconium butoxide, zirconium nitrate, zirconium silicate, zirconium sulfate, zirconium tungstate, zirconyl ethylhexanoate, zirconyl nitrate, zirconyl chloride, zirconyl bromide, and combinations of two or more thereof.

Examples of suitable boron compounds include, but are not limited to, boric acid, trimethyl boroxine, triethyl boroxine, tripropyl boroxine, and combinations of two or more thereof.

According to the second embodiment of this invention, a first solution or dispersion comprising a silicon compound such as, for example tetraethoxysilane; an aluminum compound such as, for example, aluminum nitrate; a zirconium compound such as, for example, zirconyl nitrate; and an acidic boron compound such as, for example, a boric acid, preferably $H_3BO_3$, is prepared. Any suitable concentrations of these compounds in the aqueous solution can be employed so long as the concentration can result in the production of the composition disclosed above in the first embodiment of this invention. Generally about 0.002 to about 1 mole/l of each compound, depending on the desired Si/Al/Zr/B ratio can be employed. The initial pH of this aqueous solution is generally about 1 to about 3. Each of the above compounds is present in a liquid medium.

If a homogeneous solution cannot be formed because of water-insoluble solvent is employed, a surfactant can be used.

Generally, the surfactant comprises one or more compounds which exhibit surface-active properties. A preferred surfactant for use in the reaction system of this invention is selected from the group consisting of alkoxylated compounds, quaternary ammonium salts, alkali metal alkyl sulfates, alkali metal salts of alkanoic acids, alkali metal salts of alkaryl sulfonic acids, 1-alkyl pyridinium salts, and combinations of two or more thereof.

According to the second embodiment of this invention an aqueous alkaline solution generally having a pH of about 10 to about 14 is then added to the first solution in an amount sufficient to raise the pH of the first solution to 7 or above 7, preferably to about 8 to about 9, to afford the coprecipitation of borates of silicon, aluminum and zirconium. Although any alkaline solution can be used, it is presently preferred to employ an aqueous solution of ammonia containing about 25 to about 28 weight % $NH_3$.

The dispersion of the formed coprecipitate in the pH-adjusted solution is then subjected to any suitable solid-liquid separation methods known to one skilled in the art such as, for example, filtration to substantially separate the coprecipitate from the aqueous solution. Preferably, the coprecipitate is washed with water to remove adhered solution therefrom, optionally followed by washing with a water-soluble organic solvent such as methanol, ethanol, isopropanol, acetone, or combinations of two or more thereof. The presently preferred solvent is isopropanol. The washed coprecipitate is generally dried by any methods known to one skilled in the art. The presently preferred drying is in a vacuum oven, under any pressure, at a temperature of about 110 to about 180° C. for about 1 to about 16 hours.

The dried solid is then calcined by any methods known to one skilled in the art. Generally calcination can be done in air, at a temperature of about 300 to about 1000° C., preferably about 350 to about 750° C., and most preferably 450 to 600° C., for about 1 to about 16 hours. It is within the scope of this invention to mix the formed coprecipitate with a carbon-containing binder material, such as a polyglycol, a polyoxazoline or carbon black, which is substantially burned off during the calcining step, and/or with an inorganic binder material such as, for example, alumina, colloidal alumina, clay, calcium aluminate, water glass or combinations of two or more thereof. It is also within the scope of this invention to extrude or pelletize or tablet the coprecipitate, with or without a binder, before the calcination.

A zeolite can also be incorporated into the composition of this invention for use as a cracking catalyst. The zeolite component, if present in the cracking catalyst composition, can be any natural or synthetic crystalline aluminosilicate zeolite which exhibits cracking activity. Non-limiting examples of such zeolites are faujasite, chabazite, mordenite, offretite, erionite, Zeolon, zeolite X, zeolite Y, zeolite L, zeolite ZSM-4, zeolite ZSM-5, zeolite ZSM-11, zeolite ZSM-12, zeolite ZSM-23, zeolite ZSM-35, zeolite ZSM-38, zeolite ZSM-48, and combinations of two or more thereof. Additional examples of suitable zeolites are listed in U.S. Pat. No. 4,158,621, disclosure of which is incorporated herein by reference. The term "zeolite", as used herein, includes zeolites which have been pretreated, such as those from which a portion of aluminum has been removed from the crystalline framework, and zeolites which have been ion-exchanged with rare earth metal or ammonium or by other conventional ion-exchange methods. The term "zeolite", as used herein, also includes essentially aluminum-free silica polymorphs, such as silicalite, chromiasilicates, ferrosilicates, borosilicates, and the like, as disclosed in U.S. Pat. No. 4,556,749, disclosure of which is incorporated herein by reference. Generally, the zeolite component of the catalytic cracking catalyst composition is embedded in a suitable solid refractory inorganic matrix material, such as alumina, silica, silica-alumina (presently preferred), clay, aluminum phosphate, magnesium oxide, mixtures of two or more of the above-listed materials, and the like. Generally, the weight ratio of zeolite to matrix material in the catalytic cracking catalyst composition is in the range of from about 0.01:1 to about 1:1. The weight ratio of zeolite, if present, to the composition of the invention can be in the range of from about 0.01:1 to about 1:1.

It is within the scope of this invention to mix the formed coprecipitate with a zeolite and/or with at least one carbon-containing binder material, such as polyglycol, a polyoxazoline or carbon black which is substantially burned off during the calcining step, and/or with an inorganic refractory binder material such as alumina, silica, silica-alumina, aluminum phosphate, clays, other known inorganic binders, and combinations of two or more thereof. It is also within the scope of this invention to disperse zeolite(s) and/or binder material(s) in the first solution described above before the alkaline aqueous solution described above is added to form an intimate mixture of Si/Al/Zr borate and zeolite and/or binder(s). It is within the scope of this invention to extrude or pelletize the Si/Al/Zr borate-containing material before the calcination.

According to the present invention, the Si/Al/Zr borate-containing catalytic cracking catalyst composition, which may or may not comprise a zeolite component and/or a binder component, is used in any catalytic cracking process such as, for example, a process for catalytically cracking hydrocarbon-containing oil feedstocks, in any suitable cracking reactor. The term "catalytic cracking", as used herein, implies that essentially no hydrocracking occurs and that the catalytic cracking process is carried out with a hydrocarbon-containing fluid feed substantially in the absence of added hydrogen gas, under such conditions to obtain at least one liquid product stream having a higher API gravity (measured at 60° F.) than the feed. The Si/Al/Zr borate-containing catalyst composition can be used alone or in admixture with fresh or used zeolite-containing catalyst composition in catalytic cracking processes. The term "fluid" used herein refers to gas, liquid, vapor, or combinations of two or more thereof.

The hydrocarbon-containing fluid feed stream for the catalytic cracking process of this invention can be any suitable feedstock. Generally, the fluid feed has an initial boiling point (ASTM D1160) of at least about 300° F., and preferably has a boiling range of from about 400° F. to about 1200° F., more preferably a boiling range of about 500° F. to about 1100° F., measured at atmospheric pressure conditions. Generally, this feed contains metal impurities, particularly nickel and vanadium compounds, generally in excess of about 0.01 ppm Ni and in excess of about 0.01 ppm V. The API gravity (measured at 60° F.) generally is in the range of from about 5 to about 40, preferably from about 10 to about 35. Generally, these feedstocks contain Ramsbottom carbon residue (ASTM D524; usually about 0.1 to about 20 weight %), sulfur (generally about 0.1 to about 5 weight % S), nitrogen (generally about 0.05 to about 2 weight % N), nickel (generally about 0.05 to about 30 ppm Ni, i.e., about 0.05 to about 30 parts by weight of Ni per million parts by weight of oil feed) and vanadium (generally about 0.1 to about 50 ppm V, i.e., about 0.1 to about 50 parts by weight of vanadium per million parts by weight of the fluid feed). Small amounts (generally about 0.01 to about 50 ppm) of other metal impurities, such as compounds of Cu, Na, and Fe may also be present in the oil feed. Non-limiting examples of suitable feedstocks are light gas oils, heavy gas oils, vacuum gas oils, cracker recycle oils (light cycle oils and heavy cycle oils), residua such as distillation bottoms fractions, and hydrotreated residua such as hydrotreated in the presence of Ni, Co, Mo-promoted alumina catalysts, liquid coal pyrolyzates, liquid products from the extraction or pyrolysis of tar sand, shale oils, heavy fractions of shale oils, and the like. The presently most preferred feedstocks are heavy gas oils and hydrotreated residua.

Any suitable reactor can be used for the catalytic cracking process of this invention. Generally, a fluidized-bed catalytic cracking (FCC) which can contain one or more risers or a moving-bed catalytic cracking reactor such as a Thermofor catalytic cracker is employed. Preferably, the reactor is a FCC riser cracking unit. Examples of such FCC cracking units are described in U.S. Pat. Nos. 4,377,470 and 4,424,116, disclosure of which is incorporated herein by reference. Generally a catalyst regeneration unit for removal of coke deposits is combined with the FCC cracking unit, as is shown in the above-cited patents.

Any catalytic cracking conditions known to one skilled in the art can be employed. Specific operating conditions of the cracking operation greatly depend on the type of feedstock, the type and dimensions of the cracking reactor and the fluid feed rate. Examples of operating conditions are described in the above-cited patents and in any other publications. In an FCC operation, generally the weight ratio of catalyst composition to hydrocarbon-containing fluid feed can range from about 0.01:1 to about 20:1 and preferably 0.02:1 to about 10:1, the contact time between hydrocarbon-containing fluid feed and catalyst is in the range of from about 0.2 to about 2.0 seconds, and the cracking temperature is in the range of from about 800° to about 1200° F. Generally, steam can be added with the fluid feed to the FCC reactor to aid in the dispersion of the hydrocarbon as droplets. Generally, the weight ratio of steam to the fluid feed can be in the range of from about 0.001:1 to about 1:1.

The separation of the cracking catalyst composition from gaseous and liquid cracked products, in particular hydrocarbons, and the separation of cracked products into various gaseous and liquid product fractions can be carried out by any well known, conventional separation means. The most desirable product fraction is gasoline (ASTM boiling range: about 80–400° F.). Non-limiting examples of such separation schemes are showing in "Petroleum Refining" by James H. Gary and Glenn E. Handwerk, Marcel Dekker, Inc., 1975.

Generally, the used cracking catalyst composition which has been separated from cracked gaseous and liquid products such as in a cyclone is then regenerated, preferably by steam-stripping for removal of adhered hydrocarbon and by subsequent heating under oxidizing conditions so as to burn off carbon deposits by conventional means. Thereafter, the regenerated catalyst is recycled to the catalytic cracking reactor, generally in admixture with fresh (unused) cracking catalyst.

It is within the scope of this invention, to add at least one known passivating agent such as compounds of antimony, bismuth, tin, zirconium, tungsten, boron, phosphorus, and combinations of two or more thereof to the hydrocarbon-containing fluid feed stream before the fluid feed enters the catalytic cracking reactor to alleviate detrimental effects of metal impurities, particularly compounds of nickel and vanadium present in the fluid feed. As is well known, the passivating agent can be injected either directly into the fluid feed or into a slurry recycle stream, the highest boiling fraction of cracked products, generally containing dispersed catalyst fines, which is then combined with fresh oil feed, or the passivating agent can be injected into the oxidative regenerator as above where the agent comes in contact with the hot regenerated catalyst.

The following examples are provided to further illustrate this invention and are not to be construed to unduly limit the scope of this invention.

Control catalyst A was an Al/Zr borate prepared as follows: 13.2 grams (0.053 moles) of $ZrO(NO_3)_2 \cdot 2H_2O$ and 222.1 grams (0.592 moles) of $Al(NO_3)_3 \cdot 9H_2O$ were mixed with 40.81 grams (0.660 moles) of $H_3BO_3$ (boric acid) and 1.5 liter of distilled water. The mixture was heated and stirred until all solids were dissolved.

Thereafter, concentrated aqueous ammonia was added to the entire mixture, which had a pH of about 2, until the pH rose to 8.4 and an Al/Zr/borate coprecipitate was formed. The filter cake was washed with about 1.5 liter of distilled water and then with 1.5 liter of isopropanol. The solid filter cake was dried at 150° C. for about 16 hours (overnight) in a vacuum oven, followed by calcining in air at 500° C. for 4 hours. The calcined Al/Zr borate material had a surface area, measured by the BET method using $N_2$ of 382 $m^2/g$ and a pore volume, measured by a $N_2$ pore size distribution method, of 0.5 $cm^3/g$. It contained 30.0 weight % Al, 8.4 weight % Zr and 11.0 weight % B (boron).

A series of runs were then carried out the same as described above for producing catalyst A with the exception that liquid tetraethoxy silane was also used to produce catalysts B to I. The mole quantities of zirconyl nitrate, aluminum nitrate, and tetraethoxy silane are shown in Table I below. The compositions had a constant total moles of elements (Zr+Al+B+Si) and boron while having variable moles of Zr, Al, Si, Zr/Al, and (Zr+Si).

A second series of runs for producing catalysts J–R is shown in Table II. The compositions in Table II had a constant total moles of elements (Zr+Al+B+Si), B, Al, and (Zr+Si), and had a variable moles of Zr, Si, and Zr/Al.

TABLE I

Catalyst Compositions with Constant Total Moles of Metal, B
And Variable Moles of Zr, Al, Si, Al/Zr, Si/Zr, (Al + Zr)/B, and Zr + Si*

| Catalyst | Zr | Al | B | Si | Al/Zr | Si/Zr | (Al + Zr)/B | Zr + Si | Total Metal, Moles |
|---|---|---|---|---|---|---|---|---|---|
| A | 0.053 | 0.592 | 0.660 | 0.000 | 11.170 | 0.000 | 0.977 | 0.053 | 1.3 |
| B | 0.045 | 0.590 | 0.660 | 0.005 | 13.111 | 0.111 | 0.962 | 0.050 | 1.3 |
| C | 0.091 | 0.529 | 0.660 | 0.020 | 5.813 | 0.220 | 0.939 | 0.111 | 1.3 |
| D | 0.130 | 0.485 | 0.660 | 0.025 | 3.731 | 0.192 | 0.932 | 0.155 | 1.3 |
| E | 0.160 | 0.450 | 0.660 | 0.030 | 2.813 | 0.188 | 0.924 | 0.190 | 1.3 |
| F | 0.220 | 0.385 | 0.660 | 0.035 | 1.750 | 0.159 | 0.917 | 0.255 | 1.3 |
| G | 0.329 | 0.271 | 0.660 | 0.040 | 0.824 | 0.122 | 0.909 | 0.369 | 1.3 |
| H | 0.403 | 0.192 | 0.660 | 0.045 | 0.477 | 0.112 | 0.902 | 0.448 | 1.3 |
| I | 0.478 | 0.112 | 0.660 | 0.050 | 0.234 | 0.105 | 0.894 | 0.528 | 1.3 |

*Calculated from weights of zirconyl nitrate, aluminum nitrate, boric acid and tetraethoxy silane.

TABLE II

Catalyst Compositions with Constant Total Moles of Metal, B, Al, Zr + Si
And Variable Moles of Zr, Si, Al/Zr, Si/Zr, (Al + Zr)/B*

| Catalyst | Zr | Al | B | Si | Al/Zr | Si/Zr | (Al + Zr)/B | Zr + Si | Total Metal, Moles |
|---|---|---|---|---|---|---|---|---|---|
| J+ | 0.053 | 0.592 | 0.660 | 0.000 | 11.170 | 0.000 | 0.977 | 0.053 | 1.3 |
| K | 0.048 | 0.592 | 0.660 | 0.005 | 12.333 | 0.104 | 0.970 | 0.053 | 1.3 |
| L | 0.033 | 0.592 | 0.660 | 0.020 | 17.939 | 0.606 | 0.947 | 0.053 | 1.3 |
| M | 0.028 | 0.592 | 0.660 | 0.025 | 21.143 | 0.893 | 0.939 | 0.053 | 1.3 |
| N | 0.023 | 0.592 | 0.660 | 0.030 | 25.739 | 1.304 | 0.932 | 0.053 | 1.3 |
| O | 0.018 | 0.592 | 0.660 | 0.035 | 32.889 | 1.944 | 0.924 | 0.053 | 1.3 |
| P | 0.013 | 0.592 | 0.660 | 0.040 | 45.538 | 3.077 | 0.917 | 0.053 | 1.3 |
| Q | 0.008 | 0.592 | 0.660 | 0.045 | 74.000 | 5.625 | 0.909 | 0.053 | 1.3 |
| R | 0.003 | 0.592 | 0.660 | 0.050 | 197.333 | 16.667 | 0.902 | 0.053 | 1.3 |

*Calculated from weights of zirconyl nitrate, aluminum nitrate, boric acid and tetraethoxy silane.
+Same as catalyst A.

The catalyst compositions described above were evaluated in a laboratory MAT (microanalysis test) cracking test apparatus, substantially as described in ASTM Method D3907, employing a hydrotreated crude oil feed having an API gravity of about 16 and containing about 5.4 weight % Conradson carbon, about 0.5 weight % sulfur, about 0.4 weight % nitrogen, about 1.4 weight % n-pentane insolubles, 5.5 ppm Ni, 3.1 ppm Fe, and about 7.7 ppm V. The MAT tests were carried out at a catalyst:oil weight ratio of about 3:1, a reaction temperature of 950° F., a reaction time of 75 seconds, a steam-stripping cycle of 10 minutes, and a regeneration cycle of 30 minutes at a temperature of 1250° F. Pertinent test results (averages of at least two measurements) are summarized in Table III. The product yields were calculated by dividing the weight of a particular product component produced per hour by the weight of the oil feed which had been converted per hour.

TABLE III

| Catalyst | % Feed Conversion | % Gasoline Yield | % Light Cycle Oil Yield | % Heavy Cycle Oil Yield | % Coke Yield | MFS[a] | Gas. Sel.[b] |
|---|---|---|---|---|---|---|---|
| A | 77.4 | 46.2 | 20.6 | 2.0 | 18.0 | 3.4 | 59.7 |
| B | 73.6 | 47.3 | 23.6 | 2.8 | 14.0 | 4.2 | 64.3 |
| C | 74.7 | 47.1 | 23.2 | 2.1 | 15.7 | 4.0 | 63.1 |
| D | 76.0 | 47.1 | 21.9 | 2.2 | 16.1 | 3.8 | 62.1 |
| E | 70.7 | 46.7 | 25.7 | 3.6 | 13.8 | 4.2 | 66.1 |
| F | 70.2 | 47.0 | 25.7 | 4.1 | 12.4 | 4.4 | 67.0 |
| G | 73.3 | 46.6 | 23.5 | 3.2 | 14.4 | 4.0 | 63.6 |
| H | 73.3 | 46.4 | 23.1 | 3.3 | 14.9 | 3.8 | 63.0 |
| I | 73.3 | 46.7 | 23.1 | 3.0 | 14.9 | 3.9 | 63.2 |
| K | 78.5 | 45.9 | 19.4 | 2.2 | 16.2 | 3.6 | 58.5 |
| L | 73.5 | 48.3 | 23.4 | 3.1 | 12.5 | 4.6 | 65.7 |
| M | 71.5 | 47.4 | 24.9 | 3.6 | 12.3 | 4.6 | 66.3 |
| N | 79.9 | 47.3 | 18.8 | 1.4 | 16.1 | 3.8 | 59.3 |
| O | 77.8 | 47.9 | 20.3 | 1.8 | 15.2 | 4.0 | 61.6 |
| P | 75.1 | 48.0 | 22.8 | 2.1 | 15.5 | 4.0 | 64.0 |
| Q | 66.7 | 43.9 | 26.3 | 7.0 | 12.1 | 3.7 | 65.8 |
| R | 45.9 | 30.6 | 30.5 | 23.6 | 8.4 | 2.0 | 66.5 |

[a]Moter fuel selectivity is defined as the ratio of (% gasoline yield + % light cycle oil yield) to (% heavy cycle oil yield + % coke yield).

[b]Gasoline selectivity is defined as $\frac{(\% \text{ gasoline yield})}{(\% \text{ conversion})} \times 100$ Table III shows that catalysts B to R significantly improved gasoline selectivity over catalyst A (from 59.7% to as high as 67.0%) as well as significantly increased the motor fuel selectivity over catalyst A (from 3.4 to as high as 4.6).

Surface areas of the catalysts were also measured after the MAT tests. The results shown in Table IV below indicate that catalysts B to I which contained silicon had less change in surface area than catalyst A demonstrating that the silicon-containing catalysts were more hydrothermally stable than the catalyst that did not contain silicon.

TABLE IV

| Catalyst | Silicon (Moles) | Surface Area ($m^2/g$) | | |
|---|---|---|---|---|
| | | Fresh | Post MAT | % Change |
| A | 0.000 | 382 | 241 | 37% |
| B | 0.005 | 328 | 225 | 31% |
| C | 0.020 | 365 | 253 | 31% |
| D | 0.025 | 337 | 264 | 22% |
| E | 0.030 | 284 | 189 | 33% |
| F | 0.035 | 255 | 196 | 23% |
| G | 0.040 | 346 | 284 | 18% |
| H | 0.045 | 300 | 245 | 18% |
| I | 0.050 | 342 | 273 | 20% |

The results shown in the above examples clearly demonstrate that the present invention is well adapted to carry out the objects and attain the ends and advantages mentioned as well as those inherent therein. While modifications may be made by those skilled in the art, such modifications are encompassed within the spirit of the present invention as defined by the disclosure and the claims.

That which is claimed is:

1. A process comprising contacting a first hydrocarbon-containing fluid with a catalyst composition under a condition sufficient to convert the hydrocarbon or hydrocarbons in said first hydrocarbon-containing fluid to a second hydrocarbon-containing fluid which comprises hydrocarbon or hydrocarbons having lower molecular weights than those of the hydrocarbon or hydrocarbons in said first hydrocarbon-containing fluid wherein said catalyst composition comprises silicon, aluminum, zirconium and borate and, wherein said composition is a coprecipitate of silicon borate, aluminum borate, and zirconium borate.

2. A process according to claim 1 wherein the mole ratio of aluminum to zirconium is about 0.01:1 to about 300:1.

3. A process according to claim 1 wherein the mole ratio of silicon to zirconium is about 0.001:1 to about 30:1.

4. A process according to claim 1 wherein the mole ratio of (aluminum+zirconium) to the boron component of the borate is about 0.01:1 to about 10:1.

5. A process comprising contacting a first hydrocarbon-containing fluid with a catalyst composition under a condition sufficient to convert the hydrocarbon or hydrocarbons in said first hydrocarbon-containing fluid to a second hydrocarbon-containing fluid which comprises a hydrocarbon or hydrocarbons having lower molecular weights than those of the hydrocarbon or hydrocarbons in said first hydrocarbon-containing fluid wherein said catalyst composition comprises silicon, aluminum, zirconium, and borate, and wherein said composition is a coprecipitate of silicon borate, aluminum borate, and zirconium borate; the mole ratio of aluminum to zirconium is about 0.001:1 to about 300:1; the mole ratio of silicon to zirconium is about 0.001:1 to about 30:1; and the mole ratio of (aluminum+zirconium) to the boron component of the borate is about 0.01:1 to about 10:1.

6. A process according to clam 5 wherein the mole ratio of aluminum to zirconium is 0.1:1 to 200:1.

7. A process according to claim 5 wherein the mole ratio of silicon to zirconium is 0.005:1 to 20:1.

8. A process according to claim 5 wherein the mole ratio of (aluminum+zirconium) to boron is 0.5:1 to 3:1.

9. A process comprising contacting a first hydrocarbon-containing fluid with a catalyst composition under a condition sufficient to convert the hydrocarbon or hydrocarbons in said first hydrocarbon-containing fluid to a second hydrocarbon-containing fluid which comprises a hydrocarbon or hydrocarbons having lower molecular weights than those of the hydrocarbon or hydrocarbons in said first hydrocarbon-containing fluid wherein said catalyst composition is made by the process comprising the step of contacting a silicon compound, an aluminum compound, a zirconium compound, and a boron compound to form a mixture and under a condition sufficient to effect the coprecipitation of a complex metal oxide composition comprising silicon, aluminum, zirconium, and borate wherein the mole ratio of aluminum to zirconium is about 0.001:1 to about 300:1; the mole ratio of silicon to zirconium is about 0.001:1 to about 30:1; and the mole ratio of (aluminum+zirconium) to the boron component of the borate is about 0.01:1 to about 10:1.

10. A process according to claim 9 wherein said silicon compound is tetraethoxy silane.

11. A process according to claim 9 wherein said aluminum compound is aluminum nitrate.

12. A process according to claim 9 wherein said zirconium compound is zirconyl nitrate.

13. A process according to claim 9 wherein said boron compound is boric acid.

14. A process according to claim 9 wherein said silicon compound is tetraethoxy silane; said aluminum compound is aluminum nitrate; said zirconium compound is zirconyl nitrate; and said boron compound is boric acid.

15. A process according to claim 9 wherein said mixture is contacted with an alkaline aqueous solution.

16. A process according to claim 14 wherein said mixture is contacted with an alkaline aqueous solution.

17. A process comprising contacting a first hydrocarbon-containing fluid with a catalyst composition under a condition sufficient to convert the hydrocarbon or hydrocarbons in said first hydrocarbon-containing fluid to a second hydrocarbon-containing fluid which comprises a hydrocarbon or hydrocarbons having lower molecular weights than those of the hydrocarbon or hydrocarbons in said first hydrocarbon-containing fluid wherein said catalyst composition is made by the process comprising contacting tetraethoxy silane, aluminum nitrate, zirconyl nitrate, and boric acid to form a mixture and thereafter contacting said mixture with an ammonium hydroxide solution.

* * * * *